United States Patent [19]

Nakamura et al.

[11] 4,287,458
[45] Sep. 1, 1981

[54] DIGITAL SERVO CONTROL CIRCUIT

[75] Inventors: Tadahiko Nakamura; Kenji Nakano, both of Kanagawa, Japan

[73] Assignee: Sony Corporation, Tokyo, Japan

[21] Appl. No.: 70,523

[22] Filed: Aug. 28, 1979

[30] Foreign Application Priority Data

Aug. 30, 1978 [JP] Japan .................................. 53-104899

[51] Int. Cl.³ .............................................. H02P 5/16
[52] U.S. Cl. .................................. 318/341; 318/314; 318/318; 360/73
[58] Field of Search ............... 318/314, 318, 341, 399, 318/607, 608, 310, 329, 345 E; 179/100 S; 360/73; 328/58, 134, 141; 307/233 A

[56] References Cited

U.S. PATENT DOCUMENTS

| 3,164,777 | 10/1965 | Guanella | 328/134 |
| 3,643,012 | 2/1972 | Clark | 328/134 |
| 3,950,682 | 4/1976 | Dohanich | 318/314 |

FOREIGN PATENT DOCUMENTS

| 1426820 | 3/1976 | United Kingdom . |
| 2005869 | 4/1979 | United Kingdom . |
| 2015201 | 9/1979 | United Kingdom . |

Primary Examiner—David Smith, Jr.

Attorney, Agent, or Firm—Lewis H. Eslinger; Alvin Sinderbrand

[57] ABSTRACT

In a digital servo control system, the duty cycle of a pulse width modulated signal for controlling a drive motor is determined by digital numbers representing phase and/or speed errors preset into a memory and circulating counter. The circulating counter is driven by a clock signal which performs a number of cycles during each basic timing interval. A pulse width modulated signal is initiated by a timing pulse and is terminated by each return to zero of the most significant digit of the circulating counter. The time at which the most significant digit of the circulating counter returns to zero at the end of each of its cycles is determined by the number initially preset into it. The memory is gated with the output of a four-bit counter, which increments at the same rate that the circulating counter cycles, to either lengthen each pulse width modulated signal by one clock cycle or not. The number of times the pulse-width modulated signal is lengthened in a basic timing interval is proportional to the number preset into the memory. The contents of the memory and the circulating counter are periodically changed to correspond to detected speed and/or phase errors to update the duty cycle of the pulse width modulated control signal.

1 Claim, 39 Drawing Figures

FIG. 7A  PGC

FIG. 7B  PGA

FIG. 7C  PGB

FIG. 7D  ½ V-Sync.

DIGITAL SERVO CONTROL CIRCUIT

REFERENCE TO A RELATED APPLICATION

The present application is related to U.S. patent application Ser. No. 6,756 filed Jan. 26, 1979 by the same inventive entity as the present application and having a common assignee therewith, the disclosure of which is herein incorporated by reference.

BACKGROUND OF THE INVENTION

1. Field of the Invention

This invention relates generally to servo control circuits and more specifically is directed to digital control circuits which may be employed to control the speed and/or phase of rotation of head or other element in a video tape recorder.

2. Description of the Prior Art

The prior art contains examples of analog servo control circuits for control of the speed and/or phase of a motor. Typically, the analog devices of the prior art trigger the generation of a ramp signal upon the occurrence of a predetermined event, such as the passage of a magnetic pole piece attached to the rotating element whose speed and/or phase is to be controlled, past a stationary sensing or pickup coil to provide a sensed signal. A reference signal, which occurs after the sensed signal, is employed to sample and hold the value of the ramp signal existing at the occurrence of the reference signal. Since the amplitude of the ramp signal changes at a known rate, the amplitude of the ramp signal at any given time is proportional to the time after its initiation. The sampled and held analog value, which is proportional to the time between the sensed signal and the reference signal, is employed as a drive signal for a motor.

Such analog devices depend on the time constant of resistance-capacitance circuit components employed for generation of the ramp signal, and typically employ capacitance storage elements to perform the sample and hold function. Due to the resistance and capacitance tolerances of discrete resistors and capacitors, manual adjustment is required during the manufacture and maintenance of such devices, thus adding to manufacture and maintenance costs. In addition, the servo characteristics of analog circuits employing capacitance and resistance elements tend to vary due to the temperature coefficient and aging of such elements. Further, a system employing analog techniques cannot practically be made as an integrated circuit. Even when maximum integration is achieved, it is still necessary to externally connect discrete resistors and capacitors since capacitors in particular are not compatible with integrated circuit manufacture and the range of resistance values attainable is not acceptable. Consequently, manufacturing costs are increased and the temperature and aging variations noted in the preceding are not overcome. Furthermore, the need for assembly steps to install and adjust for such discrete externally connected parts makes integrated circuit design with such external components substantially meaningless. Moreover, if such an integrated circuit with discrete components were produced, the number of pins for connection to and from the integrated circuit chips is increased and this increase, combined with the size of the discrete components themselves, interferes with the desired high density circuit packaging.

OBJECTS AND SUMMARY OF THE INVENTION

Accordingly, it is an object of the invention to provide a novel servo control system utilizing digital techniques.

Another object of this invention is to provide a digital servo control system which is adaptable to fabrication as an integrated circuit.

According to an aspect of the invention, there is provided a digital servo apparatus for controlling rotation of a rotary member comprising means for sensing at least one angular position of the rotary member and for generating at least one angular position signal, means for rotating the rotary member, means for generating at least one reference signal, means for generating cycles of a clock signal, means for counting and for storing a plurality of bits representing the number of the cycles occurring between the at least one angular position signal and the reference signal, means for generating a pulse width modulated pulse train having a duty cycle related to the plurality of bits and means for controlling the means for rotating in response to the pulse width modulated pulse train whereby the angular position signal and the reference signal are maintained in a predetermined relationship.

According to a feature of the invention, a digital servo apparatus for controlling rotation of a rotary member is provided comprising means for storing a first digital number proportional to a speed of the rotary member, means for storing a second digital number proportional to a phase of the rotary member, means for generating a first pulse width modulated pulse train having a first pulse width responsive to the first digital number, means for generating a second pulse width modulated pulse train having a second pulse width responsive to the second digital number, means for integrating the first pulse width modulated pulse train to produce a first dc signal, means for integrating the second pulse width modulated pulse train to produce a second dc signal, means for adding the first and second dc signals to produce a control signal, and means responsive to the control signal for controlling the rotation of the rotary member.

The above, and other objects, features and advantages of the present invention will become apparent from the following description read in conjunction with the accompanying drawings in which like reference numerals designate the same elements.

DETAILED DESCRIPTION OF THE PREFERRED EMBODIMENTS

Figure 1:
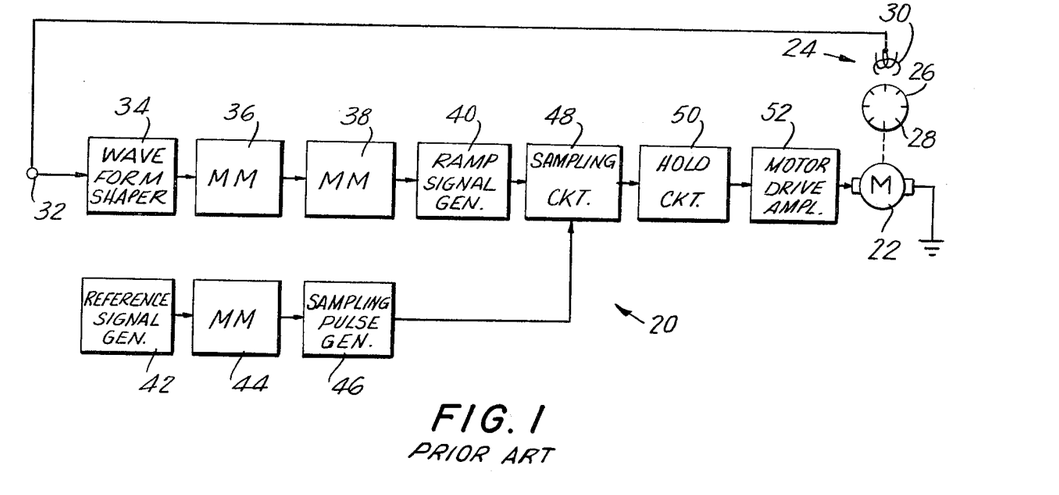
FIG. 1 is a block diagram of a servo control circuit according to the prior art.
Figure 2A:
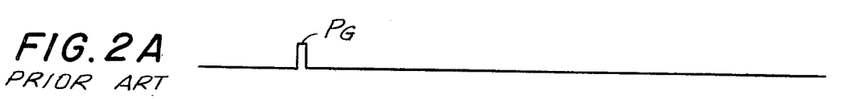
FIGS. 2A–2G are waveforms to which reference will be made in explaining the operation of the prior art circuit of FIG. 1.

Referring initially to FIG. 1, a servo control circuit 20 according to the prior art is shown in which the drive signal to a motor 22 is controlled to provide speed and/or phase control of the motor rotation. A rotational position signal generator 24 has, for example, a disc 26 mechanically coupled to rotate with the shaft of motor 22 which, for example, drives the heads of a video tape recorder. One or more magnetic pole pieces 28 may be affixed to disc 26 to rotate therewith past a pickup coil 30. As each magnetic pole piece 28 moves past pickup coil 30, a pulse $P_G$ (FIG. 2A) is induced in pickup coil 30, and such pulse $P_G$ is applied through an input 32 of servo control circuit 20 to a waveform shaper 34. Of course, other types of rotational position signal generators, such as, electro-optical, electro-static, and electro-mechanical devides or the like (not shown), may be substituted for the described electro-magnetic signal generator 24.

Figures 2B, 2C:
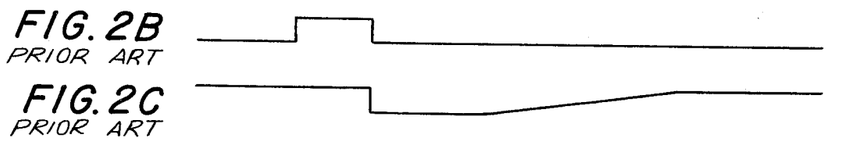

A delay in the form of a monostable multivibrator 36 receives the output of waveform shaper 34 and generates an output pulse (FIG. 2B) which terminates a predetermined time later. A gating monostable multivibrator 38 is triggered ON by the negative-going trailing edge of the output of monostable multivibrator 36. The pulse output of gating monostable multivibrator 38 is coupled to the input of a ramp signal generator 40. When the output of gating monostable multivibrator 38 is present at the input of ramp signal generator 40, the latter generates a rising ramp signal (FIG. 2C) whose amplitude at any point is proportional to the time thereto from the beginning of the signal from gating monostable multivibrator 38.

Figure 2D:
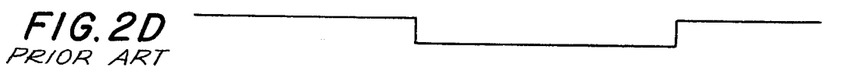
Figure 2E:
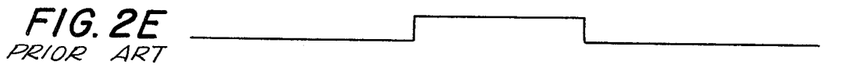
Figure 2F:
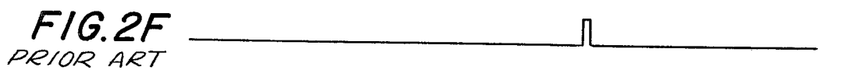

A reference signal generator 42 which can be any convenient source of a reference signal, such as, for example, a crystal oscillator, a line power frequency source, a vertical synchronizing signal source or a control signal which has been recorded on a magnetic tape, applies a pulse reference signal (FIG. 2D) to the input of a delay monostable multivibrator 44. In the example of the prior art shown on FIG. 1, the output of reference signal generator 42 is assumed to be a vertical synchronizing pulse. The delay monostable multivibrator 44 is triggered into producing a pulse output of fixed duration (FIG. 2E) by the negative-going leading edge of the signal from reference signal generator 42. The fixed delay pulse output of delay monostable multivibrator 44 is applied to the input of a sampling pulse generator 46 which thereupon applies a short sampling pulse (FIG. 2F) to a respective input of a sampling circuit 48. The sampling circuit 48, upon receiving the sampling pulse (FIG. 2F), samples the magnitude of the ramp and applies the sampled magnitude to a hold circuit 50 which thereupon stores the sampled magnitude of the ramp signal until a new value or magnitude is received. The analog value stored in hold circuit 50 is applied to an input of a motor drive amplifier 52 so as to be amplified therein, and the resulting amplified drive signal (FIG. 2G) is applied to motor 22 for driving the latter.

Figure 2G:
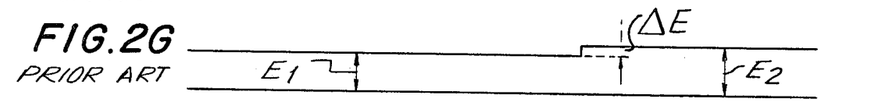

In the example shown, prior to the occurrence of the sampling pulse (FIG. 2F), the voltage fed to motor 22 as a result of a signal stored in hold circuit 50 during the previous cycle has the value $E_1$ (FIG. 2G). Upon the occurrence of the sampling pulse, a new voltage $E_2$, having an amplitude $\Delta E$ greater than $E_1$, is applied to motor 22 to increase the motor speed. Conversely, the voltage from motor drive amplifier 52 may actuate a brake which properly decreases or increases the retarding force on the motor in proportion to its amplitude and thereby maintains the motor speed and phase in predetermined relationship to the reference signal from reference signal generator 42.

Figure 3A:
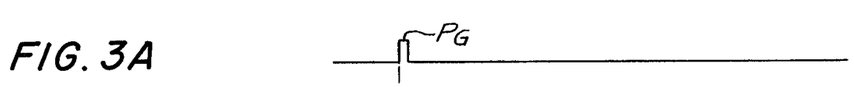
FIGS. 3A–3G are waveforms to which reference will be made in explaining the general principle of operation of a digital servo control circuit according to an embodiment of the present invention.
Figure 3B:
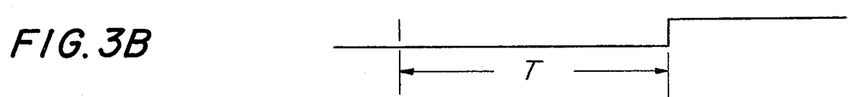

The principle of a digital servo speed control circuit will now be described with reference to FIGS. 3A–3G. In general, the purpose of such digital servo speed control circuit is to generate control signals which tend to maintain constant the time T between a first event, such as, the generation of a first pulse signal $P_G$ (FIG. 3A), and the occurrence of a second event, such as the positive going edge of a reference signal (FIG. 3B). The first pulse signal $P_G$ of FIG. 3A may be, for example, the output of rotational position signal generator 24 (FIG. 1), and the event producing the positive going leading edge of the signal in FIG. 3B may be, for example, the occurrence of a second pulse from a second pickup coil (not shown) spaced from pickup coil 30.

Figure 3C:
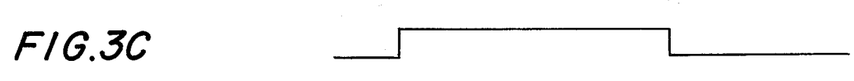
Figure 3D:
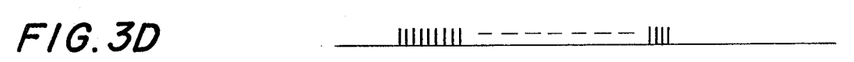
Figure 3E:
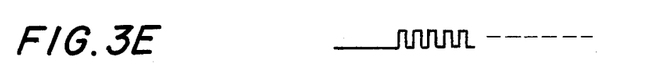
Figure 3F:
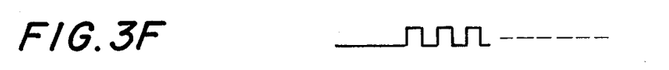
Figure 3G:
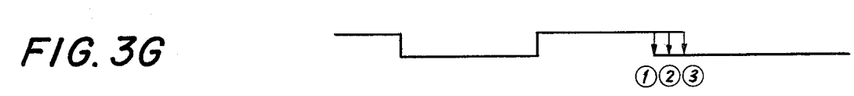

In order to avoid the need for a ramp signal generator and a sample and hold circuit to generate a motor control signal, the present invention employs pulse width modulation to produce a signal which contains more or less energy in accordance with the time T between the two signals. The signals in FIGS. 3A and 3B may be employed to define the leading and trailing edges of a pulse signal, such as shown in FIG. 3C, which defines the speed measurement period. During the speed measurement period of FIG. 3C, a total number of clock pulses, such as are shown in FIG. 3D, proportional to the length of time T, are counted in a counter. FIGS. 3E, 3F and 3G respectively show the conditions of a first stage $CT_1$, a second stage $CT_2$ and an Nth stage $CT_N$ of a counter. The number contained in the counter at the end of the speed measurement period remains stored therein. The number stored in the counter is used to control the duty cycle, or ratio of ON time to total time, of a pulse-width modulated control signal. It will be evident that, if period T (FIG. 3C) is long (indicating relatively slow speed), a number of clock pulses ending at (3) on FIG. 3G is stored in the counter after the end of the speed measurement period. The relatively large number thus stored tends to increase the duty cycle of the pulse width modulated signal and thus to increase the speed of the motor. Conversely, if period T is relatively short (indicating relatively high speed), a smaller number of clock pulses ending at (1) is stored and thus produces a pulse width modulated signal of lower duty cycle which tends to slow down the motor.

Figure 4A:
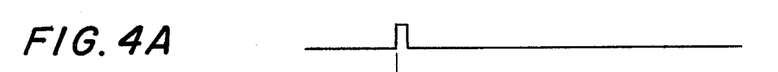
FIGS. 4A–4B are waveforms to which reference will be made in describing the principle of phase control employed in the present invention.
Figure 4B:
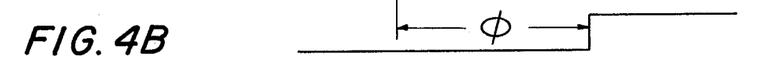

Phase control of the motor requires measurement of the time between a signal related to motor position and an external reference signal. Referring to FIGS. 4A and 4B, an external reference signal (FIG. 4A), which may be produced, for example, by a crystal oscillator, a control signal reproduced from a magnetic tape, a line frequency pulse, or a television vertical synchronizing signal, defines the beginning of a phase measurement interval $\phi$ which terminates upon the occurrence of a signal (FIG. 4B) related to motor position. As in the case of speed control previously described, clock pulses are counted during the phase measurement interval $\phi$ and the number counted at the end of the phase measurement interval $\phi$ is used to produce a pulse width modulated signal which adjusts the rotational position of the motor until it assumes the desired phase with respect to the external reference signal.

The speed measurement and phase measurement can be combined to produce a single pulse width modulated signal capable of controlling both the speed and the phase of the motor, or separate speed and phase pulse width modulated signals may be produced and applied to the motor.

Figure 5:
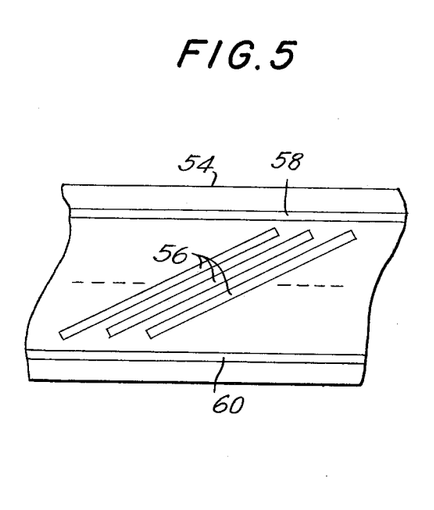
FIG. 5 is a plan view of a length of magnetic tape having represented thereon various tracks in which video, audio and control signals are recorded by means of a video tape recorder.
Figure 6:
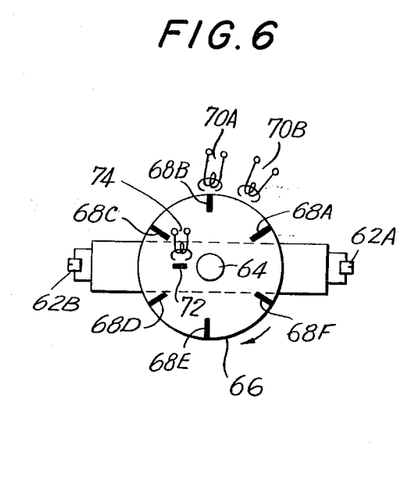
FIG. 6 is a schematic plan view of a part of a video tape recorder having rotary heads and means for generating reference signals so as to be suitable for use with the embodiment of the invention shown in FIG. 8.

The generation of signals to be employed in a digital servo control circuit according to the present invention will now be described with reference to FIGS. 5 and 6.

A conventional magnetic video tape 54 (FIG. 5) may have recorded thereon in a well known manner a plurality of skewed video tracks 56 as well as an audio track 58 parallel to one longitudinal edge of the tape and a control track 60 along the other longitudinal edge of the tape. Although not necessary to the practice of the invention, each of skewed video tracks 56 may conventionally contain the video information for a single field. Control track 60 may have control signals recorded therein at spaced apart locations corresponding to skewed video tracks 56 in response to the vertical synchronizing pulses of the video signal recorded in skewed video tracks 56.

Skewed video tracks 56 are recorded and/or reproduced by first and second video heads 62A and 62B (FIG. 6) which are rotated about a rotary shaft 64 in a well known manner. A disc 66 may be affixed to rotary shaft 64 to rotate with video heads 62A and 62B. A plurality, suitably six, of magnetic pole pieces 68A–68F are spaced apart at equal angles about the perimeter of the disc 66. A first pickup coil 70A and a second pickup coil 70B are angularly spaced apart, suitably 18 degrees apart, adjacent the perimeter of disc 66. As one of the magnetic pole pieces, for example, magnetic pole piece 68B, moves in the clockwise direction indicated by the arrow past pickup coils 70A and 70B, a signal PGA (FIG. 7B) is first generated in pickup coil 70A and then a second signal PGB (FIG. 7C) is generated in coil 70B. The time between the signals PGA and PGB from pickup coils 70A and 70B is, of course, dependent upon the speed at which video head 62A and 62B are rotating. In the embodiment shown, six output pulses or signals are generated by each of pickup coils 70A and 70B during each revolution of disc 66.

Figure 7A:
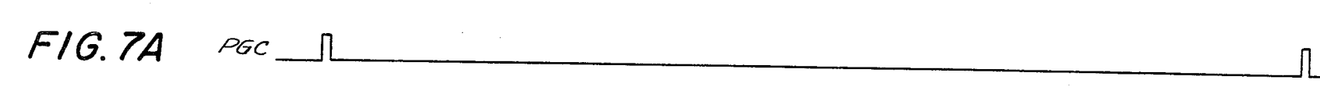
FIGS. 7A–7D are waveforms to which reference will be made in describing signals generated by the apparatus of FIG. 6.
Figure 7B:
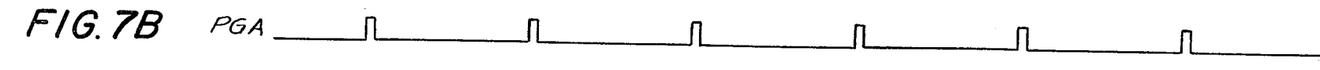
Figure 7C:
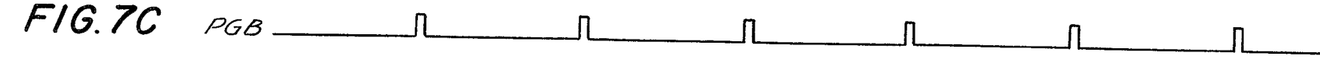

Another magnetic pole piece 72 is disposed on disc 66, and a pickup coil 74 is fixedly located so that, as magnetic pole piece 72 rotates therepast once per revolution of disc 66, pickup coil 74 generates a pulse signal PGC (FIG. 7A). Conventionally, magnetic pole piece 72 is aligned with one of video heads 62A or 62B, in the example shown, video head 62A. Thus, the single pulse output PGC from pickup coil 74 bears a fixed relationship to the rotational position or phase of video heads 62A and 62B. Although not necessary for the functioning of the invention, pickup coils 74, 70A and 70B are arranged so that the pulse PGC (FIG. 7A) from pickup coil 74 precedes a pulse or signal PGA (FIG. 7B) from pickup coil 70A which, in turn, precedes a pulse or signal PGB (FIG. 7C) from pickup coil 70B. Following these three signals, an additional five pairs of PGA and PGB signals are generated by pickup coils 70A and 70B, respectively, before the next PGC signal is generated by pickup coil 74.

Figure 8:
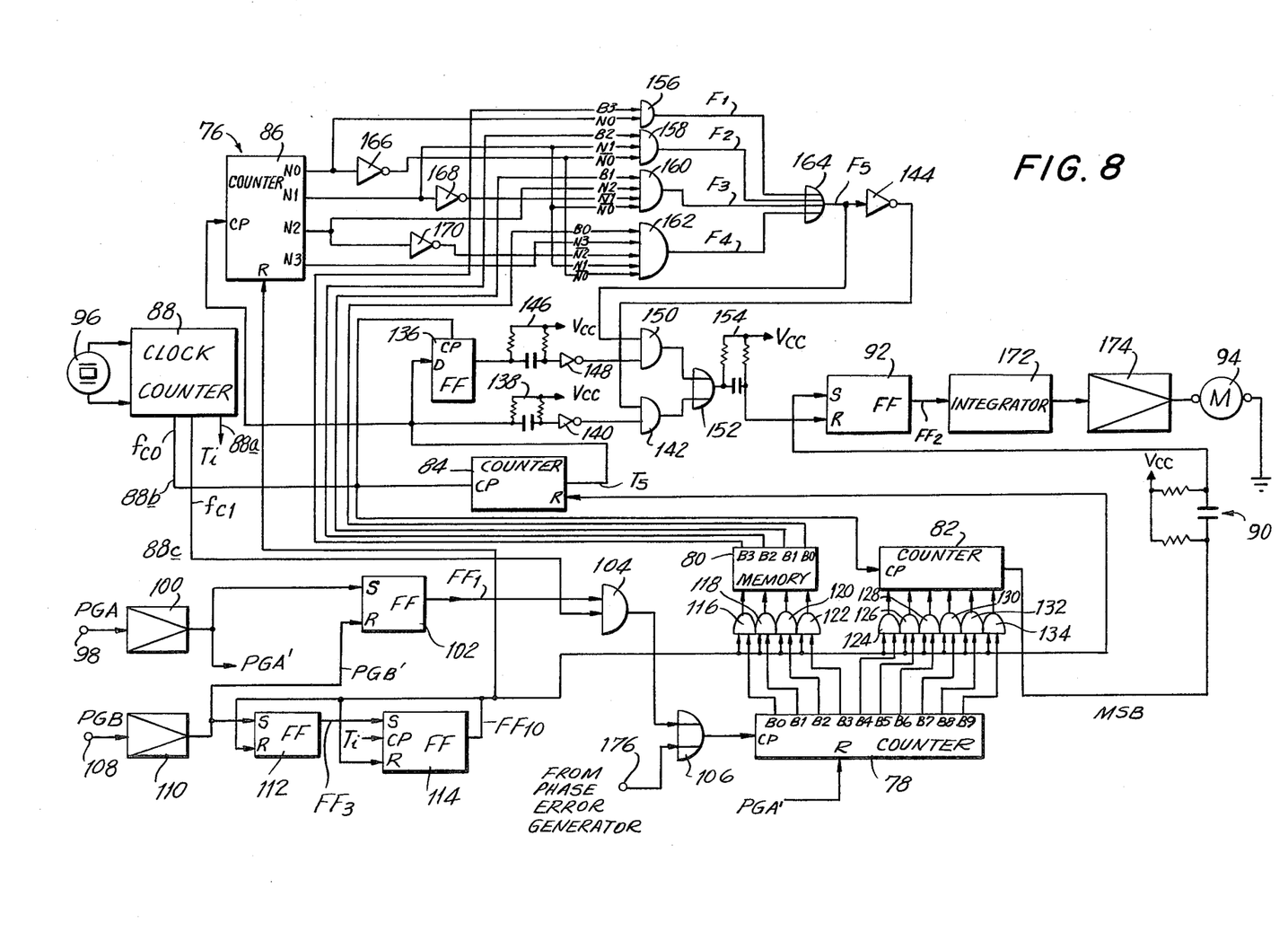
FIG. 8 is a block diagram of a digital servo control apparatus including a speed error detecting circuit according to an embodiment of the present invention.

Referring now to FIG. 8, there is shown a digital servo speed control circuit 76 which measures the time difference between signals PGA and PGB which occur six times per revolution of the video heads and produces a large number of pulse width modulated control signals after each speed measurement. Briefly, the speed of the video heads 62A and 62B (FIG. 6) is measured by storing clock pulses in a 10-bit error-accumulating counter 78 for the speed measurement interval between signals PGA and PGB.

At the end of the speed measurement interval, the four least significant bits of the 10-bit number stored in error-accumulating 78 are transferred into a 4-bit memory 80 and the six higher significant bits are preset into a 6-bit counter 82. At the same time, a 6-bit counter 84 and a 4-bit counter 86 are reset to zero. 6-bit counter 82 and 6-bit counter 84 are clocked by a clock signal $f_{CO}$ on a line 88b from a clock counter 88. The most significant bit (MSB) output of 6-bit counter 82 is differentiated in a differentiating circuit 90 and is applied to the set input S of a flip-flop 92. This initiates a pulse-width modulated signal $FF_2$ from flip-flop 92. The most significant bit output T5 of 6-bit counter 84 terminates pulse-width modulated signal $FF_2$ either immediately upon its occurrence or delayed one pulse of clock signal $f_{CO}$ according to the stored content of 4-bit memory 80 and the number contained at that time in 4-bit counter 86 as will be explained. Thus the width of pulse-width modulated signal $FF_2$ is controlled by the time between the occurrences of signals PGA and PGB. Pulse-width modulated signal $FF_2$ is employed to control the speed of a motor 94.

In greater detail, clock counter 88 is preferably controlled by a quartz crystal 96 cut to produce a suitable frequency of, for examle, 3.58 MHz. The outputs on output lines 88a–88c of clock counter 88 are as follows:

| OUTPUT LINE | SIGNAL | FREQUENCY |
| --- | --- | --- |
| 88a | $T_i$ (narrow pulses) | 3.5 KHz ($f_{CO}$/1024) |
| 88b | $f_{CO}$ | 3.58 MHz |
| 88c | $f_{CI}$ | 895 KHz ($f_{CO}$/4) |

Signal PGA is applied through input terminal 98 to an amplifier 100. The amplified output PGA' of amplifier 100 is applied to the set input S of a flip-flop 102 and to the reset input R of error-accumulating counter 78. The set output $FF_1$ of flip-flop 102 is applied to, and enables, one input of an AND gate 104. The 895 KHz clock signal $f_{CI}$ on output line 88c of clock counter 88 is applied to the second input of AND gate 104. During the presence of signal $FF_1$ from flip-flop 102, the 895 KHz clock pulses are gated through AND gate 104 and pass through an OR gate 106 to the clock terminal CP of error-accumulating counter 78.

Signal PGB is applied through an input terminal 108 to an amplifier 110. The amplified output PGB' of amplifier 110 is applied to the reset input of flip-flop 102 to terminate output signal $FF_1$ and to the set input of a flip-flop 112. Since the period of signal $FF_1$ is controlled by the time difference of arrival of signals PGA and PGB, the number of 895 KHz pulses gated through AND gate 104 and OR gate 106 into error-accumulating counter 78 is also proportional to this time difference. Thus the number stored in error-accumulating counter 78 is proportional to speed.

Flip-flop 112 is triggered into the set condition by the application of signal PGB' at its set input S and provides a set output $FF_3$ to the set input of a flip-flop 114. The next-occurring narrow timing pulse $T_i$ applied to the clock input CP of flip-flop 114 triggers flip-flop 114 into the set condition and produces a set output $FF_{10}$ which is applied to the reset inputs of 4-bit counter 86 and 6-bit counter 84 and to one input of each of two-input AND gates 116–134. The leading edge of signal $FF_{10}$ resets counters 84 and 86 and transfers the four least significant digits $B_0$–$B_3$ from error-accumulating counter 78 through And gates 116–122 into 4-bit memory 80. The outputs $B_0$–$B_3$ of 4-bit memory 80 thereupon assume and maintain the same values as are stored therein. Similarly, the six higher significant bits in error-accumulating counter 78 are transferred through AND gates 124–134 to preset corresponding values into 6-bit counter 82.

The signal $FF_{10}$ is also fed back to the reset inputs R of flip-flops 112 and 114. This immediately resets flip-flop 112 and removes signal $FF_3$ from the set input of flip-flop 114. Upon the next occurrence of narrow timing pulse $T_i$ at the clock input CP of flip-flop 114, flip-flop 114 is also reset thus removing signal $FF_{10}$ until the next occurrence of signal PGB.

Signal PGA and PGB, since they occur six times per revolution of a video head, which itself is rotating at 60 Hz, have a repetition frequency of about 360 Hz. Thus, about 10 timing pulses $T_i$, which occur with a repetition frequency of 3.5 KHz, arrive between the occurrence of adjacent signals PGA.

Figure 9A:
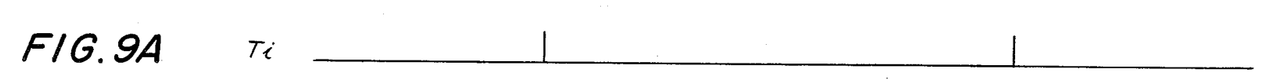
FIGS. 9A–9M are waveforms to which reference will be made in describing the principle of operation of the digital servo control apparatus of FIG. 8.

Referring now to FIG. 9A, a basic timing interval is defined as the interval between two adjacent narrow timing pulses $T_i$. In a basic timing interval, 1024 cycles of clock pulses $f_{CO}$ occur. Thus, in the basic timing interval, 6-bit counters 82 and 84 perform exactly 16 cycles. Each cycle of 6-bit counters 82 and 84 produces one pulse width modulated output signal $FF_2$ from flip-flop 92. Thus, about 160 pulse width modulated pulses $FF_2$ are produced between adjacent signals PGA or PGB.

Figure 9B:
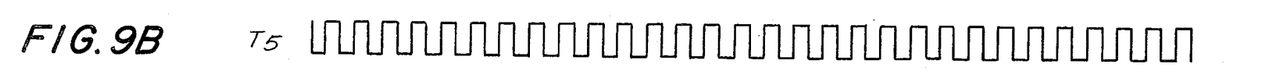
Figure 9C:
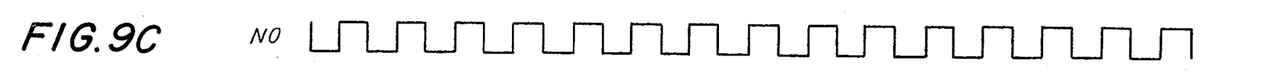
Figure 9D:
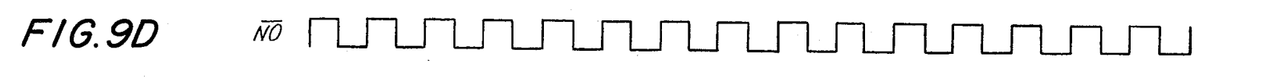
Figure 9E:
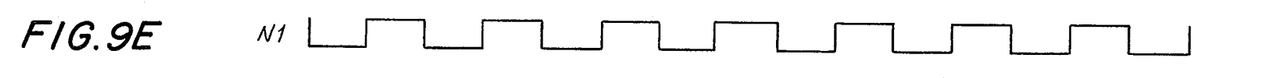
Figure 9F:
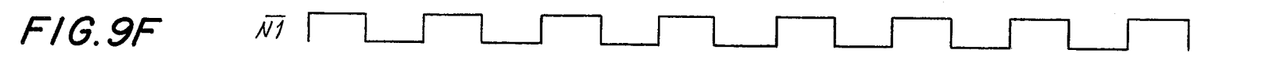
Figure 9G:
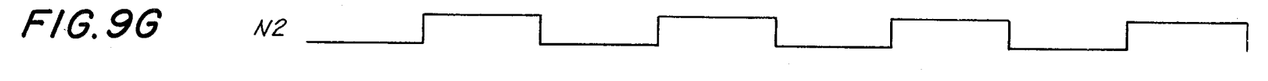
Figure 9H:
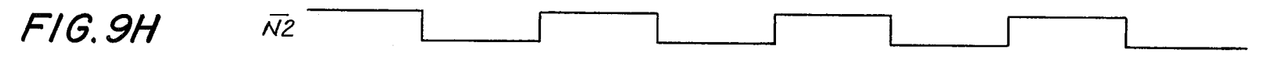
Figure 9I:
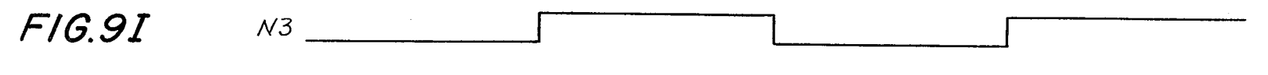

The most significant bit output $T_5$ (FIG. 9B) of 6-bit counter 84 is applied to the clock input CP of 4-bit counter 86. Thus, counters 84 and 86 in cascade form an equivalent 10-bit counter wherein the most significant bit $N_3$ (FIG. 9I) of 4-bit counter 86 is the most significant bit of the equivalent 10-bit counter. 6-bit counters 82 and 84, after being preset and reset, respectively, are clocked by the 3.58 MHz clock signal $f_{CO}$ applied to their clock inputs CP. Thus, 6-bit counters 82 and 84 are cycled together but always have the difference in their contents established during the presetting of 6-bit counter 82. Assuming that a non-zero number is preset into 6-bit counter 82, it will reach its capacity and generate signal MSB before 6-bit counter 84 attains its full capacity. The MSB signal from 6-bit counter 82 is differentiated in differentiating circuit 90 and is applied to the set input S of flip-flop 92. After a number of additional pulses of clock signal $f_{CO}$ applied to the clock input CP of 6-bit counter 84, 6-bit counter 84 generates signal $T_5$. Signal $T_5$ is applied to the D input of a delay flip-flop 136 and through a differentiating circuit 138 and an inverter 140 to one input of an AND gate 142. The other input of AND gate 142 is supplied by an inverter 144. The set output of delay flip-flop 136 is applied through a differentiating circuit 146 and an inverter 148 to one input of an AND gate 150. The other input of AND gate 150 receives a non-inverted signal $F_5$ from the input of inverter 144. Thus, AND gates 150 and 142 are alternately enabled, or made conductive, to pass only one of the signals from inverters 148 and 140 and to inhibit the other. The outputs of AND gates 150 and 142 are applied through an OR gate 152 and a differentiating circuit 154 to the reset input R of flip-flop 92. When flip-flop 92 receives the differentiated signal at its reset input R, it terminates pulse width modulated signal $FF_2$. Thus the time difference between the setting and resetting of flip-flop 92 determines the ON time, or duty cycle of pulse width modulated signal $FF_2$.

When AND gate 142 is enabled, signal $T_5$, differentiated in differentiating circuit 138, immediately resets flip-flop 92. On the contrary, when AND gate 142 is inhibited and AND gate 150 is enabled, signal $T_5$ sets delay flip-flop 136. The set output of delay flip-flop 136 applied to differentiating circuit 146 does not immediately produce a trigger signal. Instead, it is only when the next clock pulse $f_{CO}$ is applied to the clock input CP of delay flip-flop 136 that the return to zero of the set output of delay flip-flop 136 produces a trigger signal capable of resetting flip-flop 92. Thus, when AND gate 150 is enabled and AND gate 142 is inhibited, the signal for resetting flip-flop 92 is delayed by one pulse of clock signal $f_{CO}$. This increases the width of the pulse width modulated signal $FF_2$ to provide fine control of motor speed.

Control of the enablement of AND gates 150 and 142 is performed by 4-bit memory 80, 4-bit counter 86, AND gates 156, 158, 160 and 162 and OR gate 164 as well as inverters 144, 166, 168 and 170. First inputs of AND gates 156, 158, 160 and 162 are selectively enabled according to outputs $B_3$–$B_0$, respectively, of 4-bit memory 80. The other inputs of AND gates 156, 158, 160 and 162 are cyclically enabled by various combinations of outputs $N_0$–$N_3$ of 4-bit counter 86 and the inverses thereof.

Figure 9J:
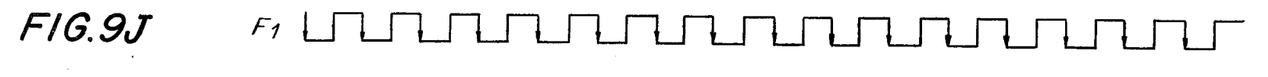

Referring now also to FIGS. 9A–9M, the basic timing interval of the apparatus is the time between adjacent occurrences of timing pulse $T_i$ (FIG. 9A). During a basic timing cycle, exactly 1024 cycles of clock signal $f_{CO}$ are produced by clock counter 88. The equivalent 10-bit counter formed of 6-bit counter 84 and 4-bit counter 86 has a total capacity of 1024 input pulses. Consequently, during one basic timing interval between adjacent timing pulses $T_i$, the equivalent 10-bit counter 84, 86 goes through one complete cycle and returns to zero and continues to repetitively cycle this way until again reset. In a basic timing interval, 6-bit counter 84 performs 16 complete cycles to produce 16 cycles of signal $T_5$ (FIG. 9B) which are applied as a clock signal to the clock input CP of 4-bit counter 86. The $\overline{N_0}$–$\overline{N_3}$ outputs of 4-bit counter 86 and the $N_0$–$N_2$ outputs of inverters 166, 168 and 170 assume the conditions shown in FIGS. 9C-9I during the basic timing interval. These signals are applied to AND gates 156, 158, 160 and 162 which, when enabled by appropriate signals from 4-bit memory 80, produce signals $F_1$-$F_4$ which are combined in OR gate 164 to form signal $F_5$. When AND gate 156 is enabled by the $B_3$ output of 4-bit memory 80, signal $F_1$ (FIG. 9J) performs 8 positive alternations in step with signal $T_5$ from 6-bit counter 84. At each positive alternation of signal $F_1$, signal $F_5$ also undergoes a positive alternation and the inverted output of inverter 144 undergoes a negative alternation thus enabling one input of AND gate 150 and inhibiting one input of AND gate 142. Thus, as previously described, at each positive alternation of signal $F_1$, the pulse width modulated signal $FF_2$ from flip-flop 92 is lengthened by one cycle of clock signal $f_{CO}$. In this way, when AND gate 156 is enabled by signal $B_3$, 8 of the 16 pulse width modulated signals $FF_2$ from flip-flop 92 during a basic timing interval are expanded by one cycle of clock signal $f_{CO}$. Thus, during a basic timing interval, signal $F_1$ is capable of increasing the total length of the 16 pulse width modulated signals $FF_2$ by a time equal to 8 cycles of clock signal $f_{CO}$.

Figure 9K:
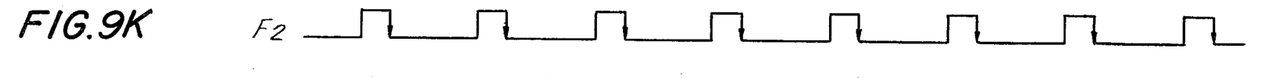

Similarly, when AND gate 158 is enabled by the $B_2$ output of 4-bit memory 80, output $F_2$ (FIG. 9K) of AND gate 158 is high for 4 cycles of $T_5$ and thus adds a total length equal to 4 cycles of clock signals $f_{CO}$ to pulse width modulated signal $FF_2$. It is to be noted that signal $F_2$ is interleaved with signal $F_1$ whereby, if both $F_1$ and $F_2$ occur in the same basic timing interval, their effect is additive to increase the total width of pulse-width modulated signals $FF_2$ by 12 cycles of clock signal $f_{CO}$.

Figure 9L:
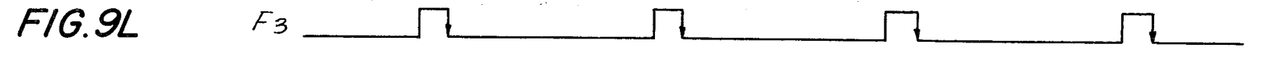
Figure 9M:
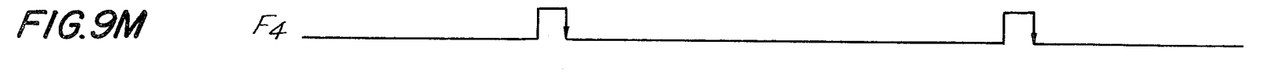

Similarly, when AND gate 160 is enabled by the $B_1$ output of 4-bit memory 80, it produces a signal $F_3$ (FIG. 9L) having two positive alternations interleaved with both signals $F_1$ and $F_2$. When AND gate 162 is enabled by output $B_0$ from 4-bit memory 80, it produces an output $F_4$ (FIG. 9M) having a single positive alternation interleaved with signals $F_1$-$F_3$. Thus, for appropriate output conditions of signals $B_0$-$B_3$ of 4-bit memory 80, any number of additional cycles of clock signal $f_{CO}$ from 0 to 15 are added to pulse width modulated signal $FF_2$ for accurate dynamic control of the pulse width modulated signal.

From the preceding description, it is evident that the duty cycle of pulse width modulated signal $FF_2$ can have any one of 1024 discrete values. Following each reset of 4-bit memory 80 and 6-bit counter 82 to different values, the duty cycle of output signal $FF_2$ jumps to a corresponding different value and, if no measures are taken to prevent it, jerky control of motor 94 would result. In order to avoid jerky control of motor 94, the pulse width modulated signal $FF_2$ from flip-flop 92 is applied to an integrator 172. Integrator 172 generates a slowly changing output signal which is proportional to the average energy in the output signal $FF_2$ and which smooths the change from one control value to another. This integrated signal is amplified by a motor drive amplifier 174 and applied to motor 94.

Pulse width modulated signal $FF_2$ may also be made responsive to phase errors by feeding pulses from a phase error pulse generator (not shown in FIG. 8) through an input terminal 176 (FIG. 8) and OR gate 106 to the clock input CP of error-accumulating counter 78 where they are added to the speed error value to produce a resultant 10-bit number $B_0$-$B_9$ for control of pulse width modulated signal $FF_2$. The phase error pulses at input 176 must, of course, be inserted at a different time from the speed error pulses from AND gate 104. This may be done in the manner described in the previously identified related application by delaying the start of signal $FF_1$ from flip-flop 102 for a fixed time long enough to permit the phase error pulses to be accumulated.

Figure 7D:
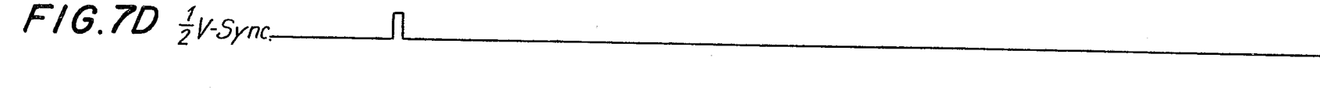
Figure 10:
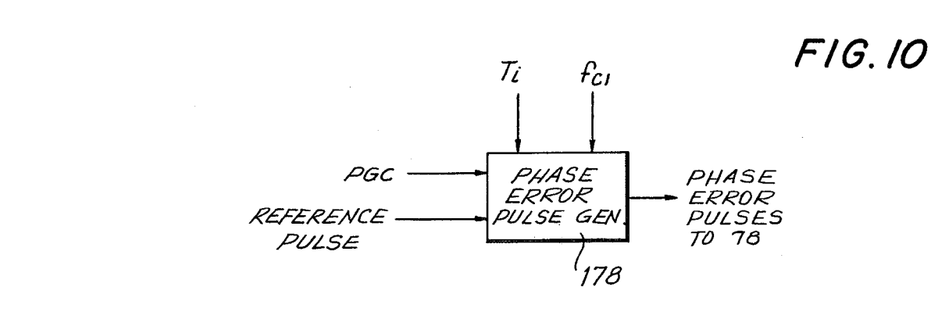
FIG. 10 is a simplified block diagram of a phase error pulse generator.

Referring now to FIG. 10, a phase error pulse generator 178 is shown which may be similar to the apparatus in FIG. 8 consisting of amplifiers 100 and 110, flip-flops 102, 112 and 114 and AND gate 104. It would be clear to one skilled in the art how phase error pulses could be produced by phase error pulse generator 178 under control of signals PGC, a reference pulse (FIG. 7D) such as, for example, a vertical synchronizing signal $\frac{1}{2}$ V-sync (FIG. 7D), a control signal reproduced from a video tape or an oscillator signal as well as inputs from clock generator 88 such as interval timing signal $T_i$ and a clock signal such as $f_{Cl}$. Since signal PGC occurs only once per revolution of video heads whereas signals PGA and PGB occur six times per revolution, buffering may be required in phase error pulse generator 178 to read out phase error pulse six times per revolution of the video heads in a manner similar to that described in the copending related application.

Figure 11:
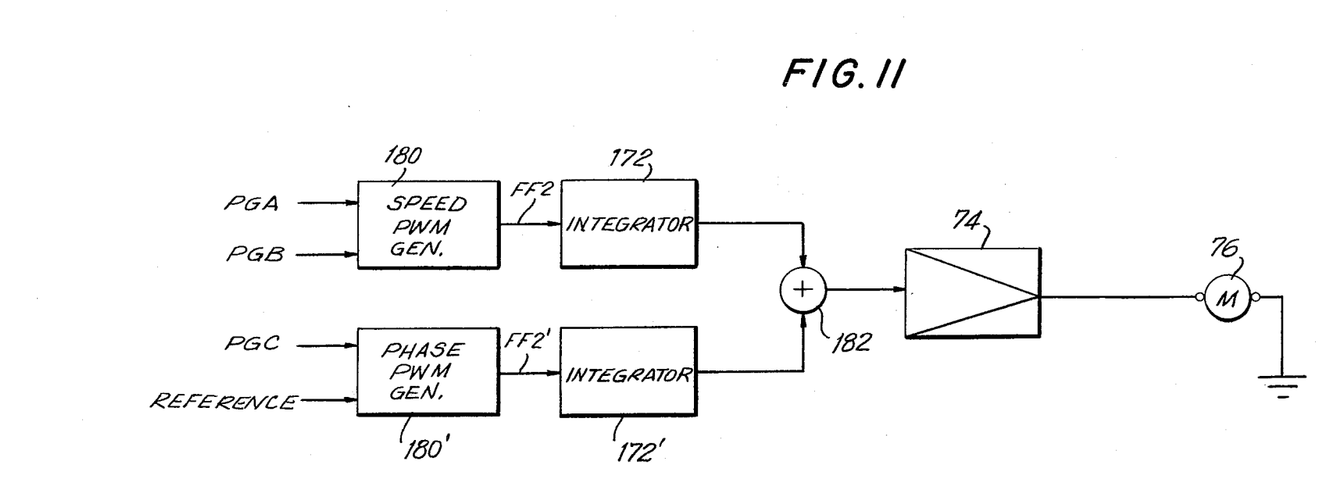
FIG. 11 is a simplified block diagram of an apparatus for combining both speed and phase correction signals for control of a motor.

An alternative method of combining speed and phase corrections is shown in FIG. 11. A speed pulse width modulation generator 180 corresponding to the apparatus from the left side of FIG. 8 up to and including flip-flop 92 applies a pulse width modulated signal $FF_2$ to an input of its integrator 172. A phase pulse width modulated signal generator 180', which may be similar to speed pulse width modulated signal generator 180, produces a pulse width modulated signal $FF_2'$ which is applied to an integrator 172'. Integrators 172 and 172' integrate and smooth their pulse width modulated input signals $FF_2$ and $FF_2'$ to produce smoothly varying DC voltages which are applied to inputs of an adder 182. Adder 182 adds the DC voltages from integrators 172 and 172' and applies the resulting DC voltage to motor drive amplifier 174 which produces an amplified drive signal which is applied to motor 94.

Having described a specific embodiment of the invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. A digital servo apparatus for controlling rotation of a rotary member comprising:
   means for generating at least one angular position signal related to an angular position of said rotary member;
   means for generating at least one reference signal;
   means for generating cycles of a clock signal;
   means for defining a basic timing interval;
   means for storing a plurality of bits corresponding to a number of said cycles associated with a time interval between said reference signal and said at least one angular position signal;
   means for generating a predetermined plurality of pulses of a pulse width modulated pulse train in each said basic timing interval, all of said predetermined plurality of pulses being generated with equal ON and OFF times determined in response to at least some of said plurality of bits;

means for modifying said ON times of individual ones of said pulses scattered through said predetermined plurality of pulses in said basic timing interval to produce a total of all of said ON times in said basic timing interval which is responsive to all of said plurality of bits; and means for controlling rotation of said rotary member in response to said total of all of said ON times in said pulse width modulated pulse train, whereby said angular position signal and said reference signal are maintained in a predetermined relationship.

2. The digital servo apparatus according to claim 1; wherein said at least one reference signal includes a second angular position signal and said predetermined relationship is a predetermined time.

3. The digital servo apparatus according to claim 1; wherein said at least one reference signal includes a vertical synchronizing signal and said predetermined relationship is a predetermined phase.

4. The digital servo apparatus according to claim 3; wherein said at least one reference signal further includes a second angular position signal and said predetermined relationship also includes a predetermined time between said at least one angular position signal and said second angular position signal.

5. The digital servo apparatus according to claim 1; wherein said means for generating a predetermined plurality of pulses includes:
a first counter having a capacity;
a second counter having a capacity equal to the capacity of said first counter;
means for presetting said first counter with at least some of said plurality of bits;
means for resetting said second counter in synchronism with the presetting of said first counter;
said means for generating cycles of a clock signal being effective to clock said first and second counters at a predetermined equal rate;
means for controlling one of a leading and a trailing edge of said pulses of said pulse width modulated pulse train each time said first counter attains a first predetermined condition; and
means for controlling the other of said leading and trailing edges of said pulses of said pulse width modulated pulse train each time said second counter attains a second predetermined condition.

6. The digital servo apparatus according to claim 5; wherein said means for modifying said ON times includes means for extending said ON time of a variable number of said plurality of pulses in said basic timing interval by a predetermined amount and said variable number being dependent on a remainder of said plurality of bits.

7. The digital servo apparatus according to claim 6; wherein said predetermined amount is a time equal to one of said cycles of said clock signal.

8. The digital servo apparatus according to claim 6; wherein said means for extending includes:
means for storing said remainder of said plurality of bits for at least said basic timing interval in coincidence with the presetting of said first counter;
a third counter having a number of bits equal to said remainder of said plurality of bits;
means for clocking said third counter each time said second counter attains said second predetermined condition;
means responsive to said third counter for gating an output during a number of pulses of said pulse width modulated pulse train according to said remainder stored in said means for storing; and means for delaying effectiveness of said second counter in producing the other of said leading and trailing edges for one of said cycles of said clock signal each time said gating means provides an output.

9. The digital servo apparatus according to claim 8; wherein said means for delaying includes:
an inverter operative to invert said output of said gating means;
a first AND gate receiving said output of said gating means;
a second AND gate receiving an output of said inverter;
a delay flip-flop;
said delay flip-flop being set by said second counter attaining said second predetermined condition;
a set output of said delay flip-flop being applied to said first AND gate;
an output of said second counter being applied to said second AND gate;
said cycles of said clock signal being applied to an input of said delay flip-flop for resetting said delay flip-flip at the end of the first of said cycles of said clock signal after the setting thereof; and
said means for producing the other of said leading and trailing edges being responsive to said resetting of said delay flip-flop when said first AND gate receives said output of said gating means.

10. The digital servo apparatus according to claim 1; wherein said plurality of bits is divided into lower significance bits and higher significance bits, said means for generating a predetermined plurality of pulses being operative for controlling part of the total of all said ON times in said basic timing interval in accordance with said higher significance bits, and said means for modifying said ON times being operative for further modifying a remainder of all of said ON times in said basic timing interval in accordance with said lower significance bits.

11. A digital servo servo apparatus for controlling rotation of a rotary member comprising:
means for generating at least one angular position signal related to an angular position of said rotary member;
means for generating at least one reference signal;
means for generating cycles of a clock signal;
means for defining a basic timing interval;
means for storing a plurality of bits corresponding to a number of said cycles associated with a time interval between said reference signal and said at least one angular position signal;
means for generating a predetermined plurality of pulses of a pulse width modulated pulse train in each said basic timing interval;
means for controlling a width of all of said plurality of pulses according to less than all of said plurality of bits;
means for modifying the width of a variable number of said pulses scattered through said predetermined plurality of pulses by a predetermined fixed amount, said variable number being dependent on a remainder of said plurality of bits; and
means for controlling rotation of said rotary member in response to said pulse width modulated pulse train, whereby said at least one angular position signal and said reference signal are maintained in a predetermined relationship.

12. The digital servo appparatus according to claim 11; wherein said at least one reference signal includes a second angular position signal and said predetermined relationship is a predetermined time.

13. The digital servo apparatus according to claim 11; wherein said at least one reference signal includes a vertical synchronizing signal and said predetermined relationship is a predetermined phase.

14. The digital servo apparatus according to claim 13; wherein said at least one reference signal further includes a second angular position signal and said predetermined relationship also includes a predetermined time between said at least one angular position signal and said second angular position signal.

15. A digital servo apparatus for controlling rotation of a rotary member comprising:
   means for storing a first digital number proportional to a speed of said rotary member;
   means for storing a second digital number proportional to a phase of said rotary member;
   means for generating a first pulse width modulated pulse train having a first pulse width responsive to said first digital number;
   means for generating a second pulse width modulated pulse train having a second pulse width responsive to said second digital number;
   means for integrating said first pulse width modulated pulse train to produce a first dc signal;
   means for integrating said second pulse width modulated pulse train to produce a second dc signal;
   means for adding said first and second dc signals to produce a control signal; and
   means responsive to said control signal for controlling rotation of said rotary member.

16. A digital servo apparatus for controlling rotation of a rotary member comprising:
   means for defining a basic timing interval;
   means for accumulating a digital number having a plurality of bits including a first plurality of lower significance bits and a second plurality of higher significance bits in response to a characteristic of said rotation;
   a memory having a number of bits equal to said first plurality;
   means for transferring said first plurality into said memory at a beginning of said basic timing interval and for retaining it therein for at least said basic timing interval;
   a first counter having a number of bits equal to said second plurality;
   means for presetting said second plurality into said first counter at said beginning of said basic timing interval;
   a second counter having a number of bits equal to said second plurality;
   a third counter having a number of bits equal to said first plurality;
   means for resetting said second and third counters at said beginning of said basic timing interval;
   means for clocking said third counter with an output of a most significant bit of said second counter whereby said second and third counters define an equivalent counter having a capacity;
   means for generating a clock signal having a number of cycles during said basic timing interval equal to an integral multiple of said capacity;
   means for clocking said first and second counters with said clock signal whereby said first and second counters cycle together with a difference in contents thereof determined by said second plurality preset into said first counter;
   means responsive to a most significant bit output of one of said first and second counters for establishing a leading edge of pulses of a pulse width modulated pulse train;
   means responsive to a most significant bit output of the other of said first and second counters for establishing a trailing edge of said pulses;
   gating means responsive to outputs of said memory and said third counter for generating control pulses coincident with a number of pulses of said pulse width modulated pulse train during said basic timing interval, said number being determined by outputs of said memory; and
   means for changing a width of individual ones of said pulses scattered through said pulse width modulated pulse train by a predetermined amount dependent on whether said control pulses coincide with said pulses.

* * * * *